(12) United States Patent
Hayes

(10) Patent No.: US 6,849,826 B2
(45) Date of Patent: Feb. 1, 2005

(54) WELDING-TYPE POWER SUPPLY WITH NETWORK SOFTWARE UPDATE

(75) Inventor: L. Thomas Hayes, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/336,633

(22) Filed: Jan. 3, 2003

(65) Prior Publication Data

US 2003/0160037 A1 Aug. 28, 2003

Related U.S. Application Data

(63) Continuation of application No. 09/956,405, filed on Sep. 19, 2001, now Pat. No. 6,504,131.

(51) Int. Cl.$^7$ ................................................. B23K 9/10
(52) U.S. Cl. ................................................. 219/130.01
(58) Field of Search ........................ 219/130.01, 130.1, 219/130.21, 130.4, 130.5, 130.33, 132, 137 PS; 363/140

(56) References Cited

U.S. PATENT DOCUMENTS

| | | | | |
|---|---|---|---|---|
| 5,436,422 A | * | 7/1995 | Nishiwaki et al. ........... | 219/110 |
| 5,571,431 A | * | 11/1996 | Lantieri et al. ......... | 219/130.01 |
| 5,708,253 A | * | 1/1998 | Bloch et al. ............ | 219/130.01 |
| 5,837,968 A | * | 11/1998 | Rohrberg et al. ......... | 219/130.1 |
| 5,850,066 A | * | 12/1998 | Dew et al. ................... | 219/109 |
| 6,236,017 B1 | * | 5/2001 | Smartt et al. .......... | 219/130.01 |
| 6,472,634 B1 | | 10/2002 | Houston et al. | |
| 6,479,792 B1 | * | 11/2002 | Beiermann et al. ...... | 219/130.5 |
| 6,504,131 B1 | * | 1/2003 | Hayes ................... | 219/130.01 |
| 6,624,388 B1 | | 9/2003 | Blankenship et al. | |

OTHER PUBLICATIONS

ALT 304 Miller® The Power of Blue Oct. 2000.
Maxstar 300 DX Miller® The Power of Blue May 2000.

* cited by examiner

Primary Examiner—Matthew V. Nguyen
(74) Attorney, Agent, or Firm—George R. Corrigan

(57) ABSTRACT

A method and apparatus for providing welding-type power are disclosed. They include a source of welding-type power and at least one welding system peripheral. Each includes a network module that has boot loader software. A network is connected to the two network modules, and the network has connection for updates that is capable of receiving software updates. The network connection for updating may be on a user interface module, disposed inside or outside of a housing of the source of welding-type power and may include an RS232 connection. The network modules may include application software. The peripheral may be a wire feeder, a robot interface, or any other peripheral. A second peripheral, with a network module and boot loader software, may also be connected to the network. The updating can occur when the system is powered up. The software update is obtained from a personal computer, a personal digital assistant, or over the internet.

24 Claims, 3 Drawing Sheets ated on Sep. 19, 2001, now U.S. Pat. No. 6,504,131.

WELDING-TYPE POWER SUPPLY WITH NETWORK SOFTWARE UPDATE

This is a continuation of application Ser. No. 09/956,405, filed on Sep. 19, 2001, now U.S. Pat. No. 6,504,131.

FIELD OF THE INVENTION

The present invention relates generally to the art of welding-type power supplies. More specifically, it relates to welding-type power supplies having a network, such as a controller area network (CAN).

BACKGROUND OF THE INVENTION

Welding power supplies or systems are available for a wide variety of processes, and with a wide variety of sophistication. Welding-type power supply or system, as used herein, includes power supplies or systems that provide welding, cutting or heating power, and may include a controller, switches, etc. Traditionally, a good weld required an experienced welder, not only to properly execute the weld, but to properly select operating parameters (such as output voltage, current, power, pulse width, wire feed speed, etc.)

Now, robots are available that execute the weld. Also, pre-determined welding programs that set operating parameters are available. These may be input to a welding-type system by a user using a user-interface such as a keypad, touch screen, control knobs, etc. Also, programs can be stored as application software and transferred to the welding-type system (where they are usually stored in non-volatile memory that is part of a controller). Application software, as used herein, includes software and data that controls a welding system before, during or after a weld, such as setting operating parameters, setpoints, etc.

It may be desirable to change application data because of improvements in the program, or improvements in the data, or because the welding-type system is used for a new or different application. Also, it may be desirable to change application software for multiple components of a welding-type system, such as the power supply, wire feeder, and robot interface.

The process of updating application software can be tedious—either entering the information through a serial interface board-by-board, or replacing a component such as an eprom (by removing the eprom and reprogramming it). Both of these procedures require removing the housing, which can be difficult.

Accordingly, a method and apparatus for updating software in a welding-type system that is easy, fast and economical. Additionally, the method and apparatus would preferably be useful over a network, so multiple components could be updated.

SUMMARY OF THE PRESENT INVENTION

According to a first aspect of the invention a welding-type power supply includes a source of welding-type power and at least one welding system peripheral. Each includes a network module that has boot loader software. A network is connected to the two network modules, and the network has connection for updates that is capable of receiving software updates.

In various embodiments the network connection for updating is on a user interface module, disposed in a housing with the source of welding-type power, disposed outside the housing, disposed on a pendant, on a network controller module, and/or includes an RS232 connection.

The network modules include application software in another alternative.

The peripheral is a wire feeder, a robot interface, or any other peripheral in various embodiments.

A second peripheral, such as a robot interface, is included, and has a network module, connected to the network, with boot loader software, in another embodiment.

According to a second aspect of the invention a method of providing welding-type power includes connecting a source of welding-type power to a network and controlling the connection by executing software that includes boot loader software. Also, at least one welding system peripheral is connected to the network, and the connection to the network is controlled by executing software that includes boot loader software. Software updates are received on the network through a network connection.

Application software that controls the source and the peripheral is also executed in other embodiments.

According to a third aspect of the invention a method of updating software used to control a welding-type system includes executing boot loader software and determining if a software update over a network is available. The boot loader software continues and a software update is executed if a software update is available, and then the execution of the boot loader software is ended after the software update has been completed. If no software update is available, then the boot loader software completes it program and is terminated.

The method is performed when the system is powered up in one embodiment.

The software update is an application software update in another embodiment.

In other embodiments, before ending the execution of the boot loader software, an error check and/or keyword check is performed, and/or application software is executed after the boot loader finishes.

The software update is obtained from a personal computer, a personal digital assistant, or over the internet in various embodiments.

According to yet another aspect of the invention, a software subroutine (a subset of software capable of controlling a welding-type power supply and a welding system peripheral) is capable of transmission through a network connection to overwrite at least a portion of the software which controls the welding-type power supply and the welding system peripheral upon prompting.

Other principal features and advantages of the invention will become apparent to those skilled in the art upon review of the following drawings, the detailed description and the appended claims.

Figure 1:
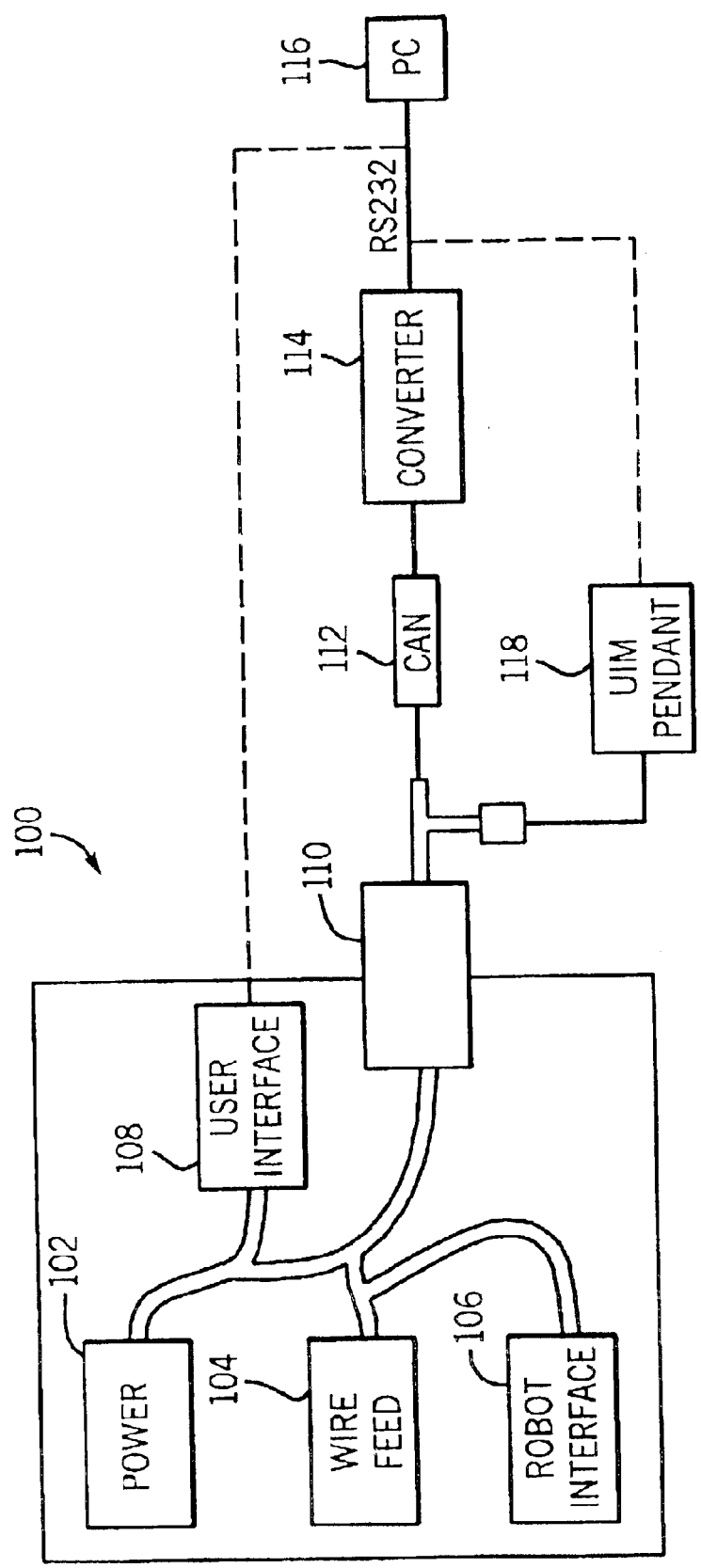
FIG. 1 is a diagram of a welding-type system in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding system and particular components, it should be understood at the outset that other welding-type system, peripherals and components could be used, and the invention could be used in other applications. Welding system peripheral, as used herein, includes wire feeders, robot interfaces, gas supplies, user interface, or other devices that work with a welding-type system.

Generally, the invention includes a controller area network (CAN), or other network, with a plurality of components in a welding-type system attached thereto. The network allows for communication between and control of (instructions, feedback, etc.) components in a welding-type system. Each component or module includes a controller and software that-controls that module. Each component also includes a network module, for connecting to and communicating through, the network. Network module, as used herein, includes a module, hardware and/or software, that effects connection to and/or communication via a network, and/or includes control software for a component or module.

Each network module (or component controller) also includes application software that controls the component, such as a motor control commands, switch inputs, etc., for a wire feeder, and display language, the information being displayed, etc., for a user interface module. Along with the application software, the network module has boot loader software that runs when the system or component boots up. Boot loader software, as used herein, includes software that loads during the booting of a software controlled system, network or module.

The invention generally provides that, at power up, the boot loader software for each component checks to see if a software update for that component is present on the network. If it isn't, the boot loader software continues to execute, including performing error check such as CRC, and key word checks. If the checks pass, control is handed off to the application software for that module or component.

If a software update is present on the network, the boot loader software updates the application software. After the software is updated, the boot loader continues to error check, key word check, and then hands off to the application software. Software updates, as used herein, includes changes to, replacements for, or additions to, software used in a welding-type system.

Thus, the boot loader software is executed at power up, the software update is executed if needed, and the application software is executed to operate the system. Executing software, as used herein, includes carrying out a program or series of instructions.

More specifically, a welding system 100, with an update network connection, includes a power control module 102 or source of welding-type power, a wire feeder module 104, a robot interface module 106, a user interface module 108 and a connection 110.

Source of welding-type power, as used herein, is the power and associated circuitry that can produce welding-type power when power is applied thereto. Update network connection, as used herein, includes a network connection on which updates may be received. It may be an internal or external,network connection. External network connection, as used herein, includes a connection from a network to a device that is not previously on the network, or is not continuously on the network. Internal network connection, as used herein, includes a connection from a network to a device that is continuously or routinely on the network.

The invention may be used with a wide variety of types of power modules or types of robot interfaces. Examples of a particularly suitable power module is found in the Miller Alt304® or Miller MaxStar® welding systems, and described in U.S. patent application Ser. No. 09/540,567, filed Mar. 31, 2000, entitled Method And Apparatus For Receiving A Universal Input Voltage In A Welding, Plasma Or Heating Power Source. Another power module is described in U.S. Pat. No. 6,115,273, entitled Power Converter With Low Loss Switching, issued Sep. 5, 2000, which is hereby incorporated by reference.

Preferably, each component or module includes its own network module, such as DeviceNet hardware and software. The network connections between modules are preferably DeviceNet compatible.

The network is connected through connector 110 to a network controller module or a CAN 112. Network controller module, as used herein, includes a module that controls all or part of a network, including a CAN. A converter 114 converts the CAN (or DeviceNet) connection to an RS232 connection. An RS232 connection is made to a PC 116, which has the software update.

When welding-type system 100 is powered up, the software in each network module boots up. It checks the network for software updates, and if an update is present on PC 116, the boot loader software updates the application software for that module. Each module may simultaneously begin the boot process, and the network protocol determines data flow on the network so that each module is updated as necessary.

Alternative connections may be made, and include as using IR or other wireless, connecting converter 114 to the internet (using perhaps an EtherNet connection), and/or using a modem. Other alternatives (which are shown with dashed connections) include connecting directly from user interface module 108 (which may be a front panel display) to PC 116. User interface module, as used herein, includes a module, software or hardware, that allows communication between a welding-type system and the user, either directly or through a network.

Another alternative includes using a pendant 118 as the user interface. Pendant, as used herein, includes a device external to a welding-type system that may be connected to or communicate with the system. In this alternative, pendant 118 is connected to PC 116. Yet another alternative is to provide a PDA as pendant 118, and the software could be provided by the PDA. The various alternatives are not intended to be exhaustive, and may be used alone or in combination.

Figure 2:
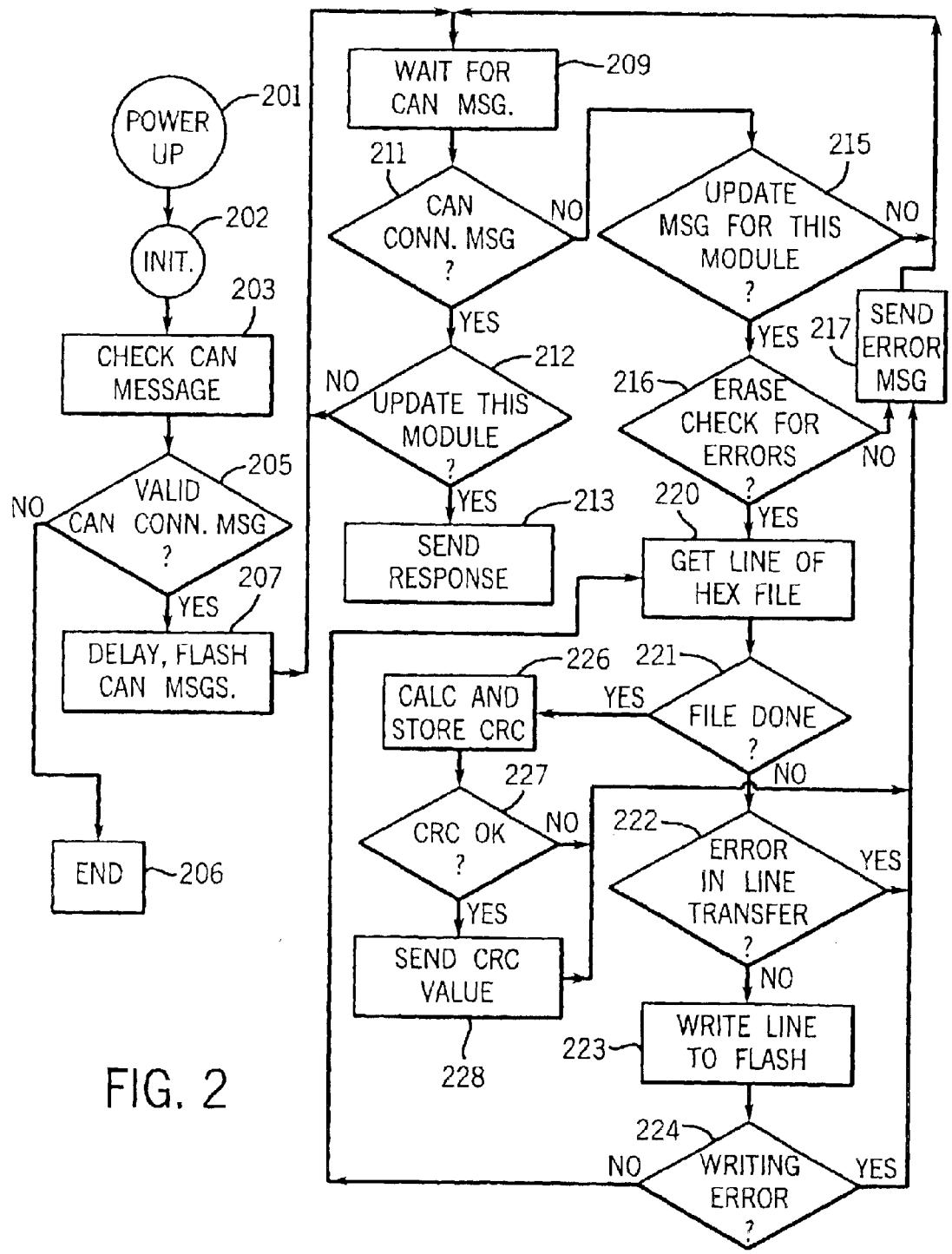
FIG. 2 is flow chart of a CAN boot loader routine.
Figure 3:
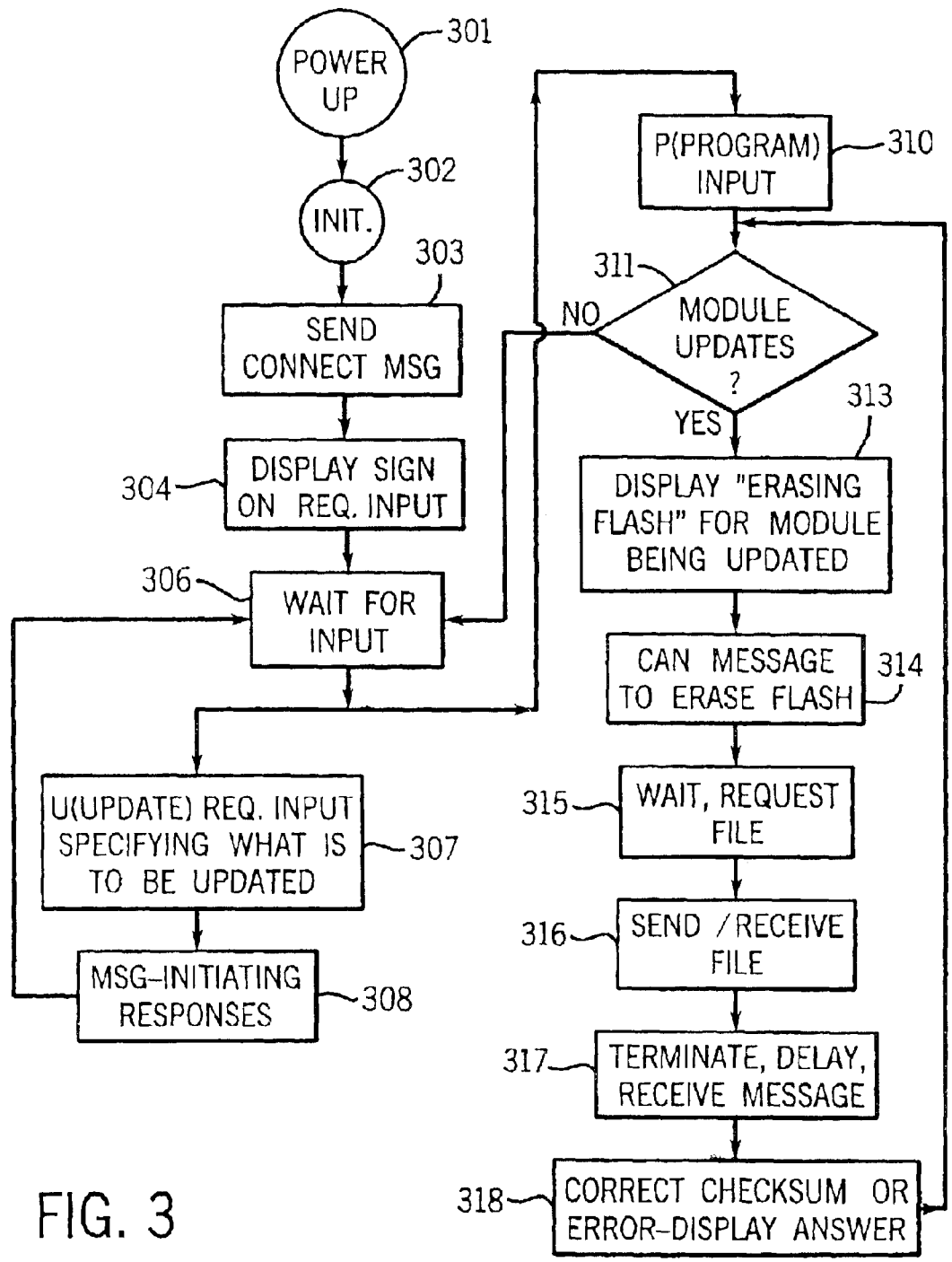
FIG. 3 is flow chart of a routine to transfer software to a CAN.

FIGS. 2 and 3 are flow charts showing the CAN boot loader software and the RS232 to CAN software. Other software may be readily used, and the flow charts are meant to be exemplary.

Referring now to FIG. 2, CAN boot loader software representative of that found in any of the modules, begins with power up at 201. The system initializes at 202 and checks for a CAN connection message at 203. The check is performed four times, at 500 ms intervals.

At 205 it is determined if a valid CAN connection message was received. If a valid CAN connection message wasn't received, then the CAN bootloader ends, and the RS232 boot loader software begins.

If a valid CAN connection message was received the program delays one second and then flushes any remaining incoming CAN messages at 207, and waits for a new CAN message at 209.

At 211 it is determined if the message received is a CAN connection message. If it is, the program checks if this module has been flagged as selected for updating at 212. If the module isn't to be updated, the routine returns to 209. If the module is to be updated, a CAN response message is sent to the controller at 213, and the routine returns to 209.

If, at 211, the message was not a CAN connection message, then at 215 it is determined if the message is a start update message for this module. If it is not, the program returns to 209.

If the message was a start update message for this module then, at 216, the flash is erased. Also, at 216, it is determined of the erasure was error free. If it was not error free, an error CAN message is sent to the controller at 217 and the program returns to 209 (and waits to start the file transfer over).

If the erasure was error free at 216, then at 220 one line of the hex file (the update) is received through CAN messages. It is determined if the hex file is done being sent at 221. If the hex file is not done it is determined if there was an error during the hex file line transfer at 222. If there is an error the routine returns an error message at 217 and then waits, at 209, to start the file transfer over.

If there was not an error during the line transfer the hex line is written to flash memory at 223. The writing is checked for errors at 224. If there was an error writing the line to flash the routine returns an error message at 217, and then waits, at 209, to start the file transfer over. If the line was properly written to flash the routine returns to 220 to get another line of the file.

If, at 221, it is determined that the file is completely transferred, then at 226 the CRC value (an error check value) is calculated and stored in flash. At 227 the CRC value is checked to see if it is OK (indicating error free transfer). If it is not OK the routine returns an error message at 217 and then waits, at 209, to start the file transfer over. If the CRC value is OK, the CRC value is sent at 228 (instead of the error message) in the next block, and the routine returns to 209.

Referring now to FIG. 3, a flow chart showing an example of the RS232 to CAN software begins with power up at 301. The system initializes at 302 and at 303 the software sends a connection message. It is sent six times at 500 ms intervals. The message is intended for five modules (one, two, three, four, or any number of modules could be present). The software causes a display sign-on message to be seen on PC 116 and requests the user to input checksums for the modules at 304. The checksums are for verification.

Next it waits for the user input through PC 116 at 306. If a "U", indicating update is received at 303, it allows, through user input commands, the user to select which modules need updating. Preferably yes or no user prompts such as "Update PCM flash? (Y/N), Update UIM flash? (Y/N) Update WFCM flash? (Y/N) Update RIO flash? (Y/N)" are provided to the PC. Then the software issues another connection message intended for the modules that require updating. A message is sent to the user to indicate whether all the modules to be updated responded at 308, and then the program returns to 306.

At 310 it checks to see if the user inputs a 'P', for the program command. If a P is entered, it checks at 311 if there are modules to update at 311. If there aren't modules to update the program returns to 306.

If there are modules to update, at 313 an "erasing flash" message is displayed (for next module that needs updating), and a CAN message is sent to the appropriate module that starts erasing the flash memory in that module at 314. The program waits 3 seconds for the erasing to be completed, and then prompts the user to send the proper.hex file from the PC (which was to replace the old application software) at 315.

The hex file is sent line by line to the appropriate module at 316. Each line includes a CRC value for error checking. After the file is sent, a terminate message is sent to the module being updated, and after a 4.5 second delay, it receives a message from the module at 317.

At 318 the program determines if the message is a checksum message, and does it agree with the value entered on startup. If it is and does, then it displays an appropriate message to the user. If the message is an error message, it displays an appropriate error message to the user. Then, the program returns to 311.

These routines may be implemented using different commands, or other routines, and other hardware, may be used to implement the CAN boot loader.

Numerous modifications may be made to the present invention which still fall within the intended scope hereof. Thus, it should be apparent that there has been provided in accordance with the present invention a method and apparatus for a welding-type system with software updates that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A welding-type power supply comprising:
   a source of welding-type power;
      wherein the source of welding-type power has a power network module;
   at least one welding system peripheral;
      wherein the peripheral has a peripheral network module;
   a network connected to the power network module and the peripheral network module; and
   an update network connection, connected to the network, and capable of receiving software updates.

2. The welding-type power supply of claim 1 further comprising a user interface module connected to the network, wherein the update network connection is on the user interface module.

3. The welding-type power supply of claim 2 wherein the source of welding-type power is disposed in a housing and the update network connection is disposed in the housing.

4. The welding-type power supply of claim 2 wherein the source of welding-type power is disposed in a housing and the update network connection is disposed on a pendant outside the housing.

5. The welding-type power supply of claim 2 wherein the update network connection is an external network connection and is an RS232 connection.

6. The welding-type power supply of claim 1 further comprising a network controller connected to the network, wherein the update network connection is on the network controller module.

7. The welding-type power supply of claim 1, wherein the power network module and the peripheral network module include application software.

8. The welding-type power supply of claim 1, wherein the peripheral is a wire feeder.

9. The welding-type power supply of claim 8, further comprising:
   a second peripheral;
   wherein the second peripheral has a second peripheral network module, connected to the network;
   further wherein the second peripheral network module has a peripheral boot loader software.

10. The welding-type power supply of claim 9, wherein the second peripheral is a robot interface.

11. A welding-type power supply comprising:
    power means for providing welding-type power;
       wherein the power means includes power network means for connecting to a network;
    at least one welding system peripheral;
       wherein the peripheral has peripheral network means for connecting the peripheral to the network;
    means for connecting the power network means and the peripheral network means; and
    means for making a connection to the network means, including means for receiving software updates.

12. The welding-type power supply of claim 11 further comprising means for interfacing with a user, connected to the network means, wherein the means for making a connection is on the means for interfacing.

13. The welding-type power supply of claim 12 wherein the power means is disposed in a housing and the means for interfacing is disposed in the housing.

14. The welding-type power supply of claim 12 wherein the power means is disposed in a housing and the means for interfacing is disposed on a pendant outside the housing.

15. The welding-type power supply of claim 11 further comprising means for controlling the network, connected to the network, wherein the means for making a connection is on the means for controlling.

16. The welding-type power supply of claim 12, wherein the power means and the peripheral network means include means for controlling a welding process.

17. The welding-type power supply of claim 1, wherein the update network connection includes an ethernet connection.

18. The welding-type power supply of claim 1 wherein the update network connection is connected to an internet, and the software updates are received over the internet and include at least one of a welding program and application data.

19. The welding-type power supply of claim 11, wherein the means for connecting includes means for connecting to an ethernet.

20. The welding-type power supply of claim 11, wherein the means for connecting are connected to an internet, and includes means for receiving software updates over the internet that include at least one of a welding program and application data.

21. A method of providing welding-type power comprising:
    connecting a source of welding-type power to a network;
    controlling the connection of the source to the network by executing software, including updating software;
    connecting at least one welding system peripheral to the network;
    controlling the connection of the peripheral to the network by executing software; and
    receiving software updates on the network through a network connection.

22. The method of claim 21, further comprising executing application software that controls the source and executing application software that controls the peripheral.

23. The method of claim 21, wherein receiving includes receiving from an internet connection.

24. The method of claim 21, wherein receiving includes receiving at least one of application software and application data.

* * * * *